United States Patent [19]
Fletcher

[11] Patent Number: 5,040,615
[45] Date of Patent: Aug. 20, 1991

[54] QUICK ATTACHING POWER-TAKE-OFF CONVERSION UNIT

[75] Inventor: Timothy M. Fletcher, Burnett, Wis.

[73] Assignee: Support Services International, Inc., Beaver Dam, Wis.

[21] Appl. No.: 613,351

[22] Filed: Nov. 15, 1990

Related U.S. Application Data

[63] Continuation-in-part of Ser. No. 567,975, Aug. 15, 1990.

[51] Int. Cl.⁵ .................. A01B 71/06; A01B 59/06
[52] U.S. Cl. ............................. 172/47; 172/125; 172/273; 74/15.63; 474/113
[58] Field of Search .............. 172/47, 125, 272, 273; 474/113, 117, 133, 135; 74/11, 15.6, 15.63

[56] References Cited

U.S. PATENT DOCUMENTS

| | | | |
|---|---|---|---|
| Re. 27,177 | 9/1971 | Schlapman et al. | 74/15.63 |
| 2,450,080 | 9/1948 | Burrell et al. | 74/15.63 |
| 3,383,927 | 5/1968 | Suchy | 74/15.63 |
| 3,398,587 | 8/1968 | Martin | 74/15.63 |
| 3,483,938 | 12/1969 | Enters | 172/817 X |
| 3,588,147 | 6/1971 | Enters | 172/272 X |
| 3,876,091 | 4/1975 | MacDonald | 172/273 |
| 3,876,092 | 4/1975 | MacDonald | 172/273 |
| 4,085,856 | 4/1978 | Westendorf | 172/273 |
| 4,116,346 | 11/1978 | Uchida | 172/273 |
| 4,452,560 | 6/1984 | Coyle et al. | 172/273 |
| 4,477,101 | 10/1984 | Nilsson et al. | 172/272 |
| 4,509,768 | 4/1985 | Haug | 172/272 |
| 4,625,988 | 12/1986 | Witchey et al. | 172/273 |
| 4,737,067 | 4/1988 | Samejima et al. | 172/297 |
| 4,755,101 | 7/1988 | Hamada et al. | 172/274 |
| 4,826,389 | 5/1986 | Meyer et al. | 172/273 |
| 4,838,101 | 6/1989 | Dobberpuhl et al. | 74/15.63 |

FOREIGN PATENT DOCUMENTS

| | | | |
|---|---|---|---|
| 3511370 | 10/1985 | Fed. Rep. of Germany | 172/125 |
| 596723 | 8/1959 | Italy | 474/113 |

OTHER PUBLICATIONS

John Deere Lawn and Garden Tractors, 300-400 Series.

*Primary Examiner*—David H. Corbin
*Assistant Examiner*—Jeffrey L. Thompson
*Attorney, Agent, or Firm*—Lathrop & Clark

[57] ABSTRACT

The power-take-off conversion unit of this invention is adapted for attachment to a vehicle with a driving pulley rotatable in a generally vertical plane and driving an elastic belt, wherein the vehicle has two mounting brackets located beneath the pulley. The unit has a frame with an arm that extends rearwardly from a rear portion of the frame. Two pins extending from the arm are adapted to engage within the mounting brackets on the vehicle to allow the frame to rotate about a horizontal axis. The frame has a planar locking surface extending therefrom and a cam surface which extends downwardly and outwardly from the locking surface. A driven pulley is rotatively mounted within the frame to engage with and be driven by the elastic belt of the vehicle. A belt-tensioning bar is rotatively mounted to the vehicle about a horizontal axis which is located above the locking surface of the frame. The bar has a portion which is downwardly offset to engage with the cam surface of the frame and cause the frame to rotate such that a desired tension will be applied to the belt. A driveshaft extends from the driven pulley and is adapted for driving engagement with an implement attached to the vehicle. A releasable lock is located on the belt-tensioning bar to selectively fix the position of the bar with respect to the vehicle.

9 Claims, 10 Drawing Sheets

BEST AVAILABLE COPY

QUICK ATTACHING POWER-TAKE-OFF CONVERSION UNIT

This application is a continuation-in-part of application Ser. No. 07/567,975, filed Aug. 15, 1990.

FIELD OF THE INVENTION

The present invention relates to couplers for quickly attaching implements to vehicles in general and to power-take-off conversion units for such couplers in particular.

BACKGROUND OF THE INVENTION

Utility-type vehicles are commonly used to perform a number of different jobs. The same vehicle may be used to plow, till, brush, blow, transport or drill. Each job requires the attachment of a specialized implement. Implements which mount directly to the vehicle may be heavy and cumbersome and require that the vehicle operator dismount to couple the implements to the vehicle. Frequently, more than one person will be required to properly attach the implement.

Quick attaching couplers are known for connecting implements to earthmoving equipment, particularly different buckets to front-end loaders. However, while front-end loaders need only to be raised and lowered, implements such as plows, snowblowers and brooms need also to be rotatable in a horizontal plane.

Furthermore, most quick attaching couplers are not themselves easily removable from the vehicle. Utility vehicles, which may have implements mounted in the rear and mowers mounted beneath, for purposes of balance, maneuverability, and convenience, would benefit from a coupler that is itself easily removable.

Many conventional vehicles, such as light utility tractors, have vertically mounted belt-drive pulleys which extend from the vehicle engine. Many commonly available implements, however, are adapted to be driven by a rotating power-take-off shaft. To accommodate these implements to a vehicle having a belt-drive pulley, each particular implement is commonly provided with an apparatus for converting the rotary motion of the tractor belt-drive pulley to the rotary motion of a power-take-off shaft. A user of a multiplicity of implements must then acquire conversion units for each implement. Not only are multiple conversion units costly, but additional time is required for each change of implement to substitute the new implement conversion unit.

A power-take-off conversion unit is needed which may be quickly attached to a vehicle having a belt-drive pulley, which may be easibly adjusted and which may be readily utilized to drive any conventional shaft-driven implement.

SUMMARY OF THE INVENTION

The power-take-off conversion unit of this invention is adapted for attachment to a vehicle with a driving pulley rotatable in a generally vertical plane and driving an elastic belt, wherein the vehicle has two mounting brackets located beneath the pulley. The unit has a frame with an upright front portion which is connected by a top portion to a rear portion which is horizontally spaced from the front portion. An arm member extends rearwardly from the rear portion and has two pins which extend horizontally to either side of the rear of the arm member. The pins are adapted to engage within the mounting brackets on the vehicle to allow the frame to rotate about a horizontal axis. The frame has a planar locking surface which extends from the front portion and is generally perpendicular to the front portion. A cam surface extends downwardly and outwardly from the locking surface. A driven pulley is rotatively mounted within the frame between the front and rear portions of the frame and is adapted to engage within and be driven by the elastic belt of the vehicle. A belt-tensioning bar is rotatively mounted to the vehicle about a horizontal axis which is located above the locking surface of the frame. The bar has a portion which is downwardly offset from the axis of rotation of the bar and is adapted to be rotated such that the offset portion will engage with the cam surface of the frame and cause the frame to rotate such that a desired tension will be applied to the belt by the driven pulley when the bar offset portion is engaged with the locking surface of the frame. A driveshaft extends from the driven pulley and is adapted for driving engagement with an implement attached to the vehicle. A releasable look is located on the belt-tensioning bar to selectively fix the position of the bar with respect to the vehicle.

It is an object of the present invention to provide a power-take-off conversion unit which will convert the rotary motion of a belt-drive pulley to the rotary motion of a shaft.

It is another object of the present invention to provide a power-take-off conversion unit which may be commonly utilized by a variety of shaft-driven implements.

A further object of the present invention is to provide a power-take-off conversion unit which may be easily and rapidly attached and detached from the vehicle.

Further objects, features and advantages of the invention will be apparent from the following detailed description when taken in conjunction with the accompanying drawings.

DESCRIPTION OF THE PREFERRED EMBODIMENT

Figure 1:
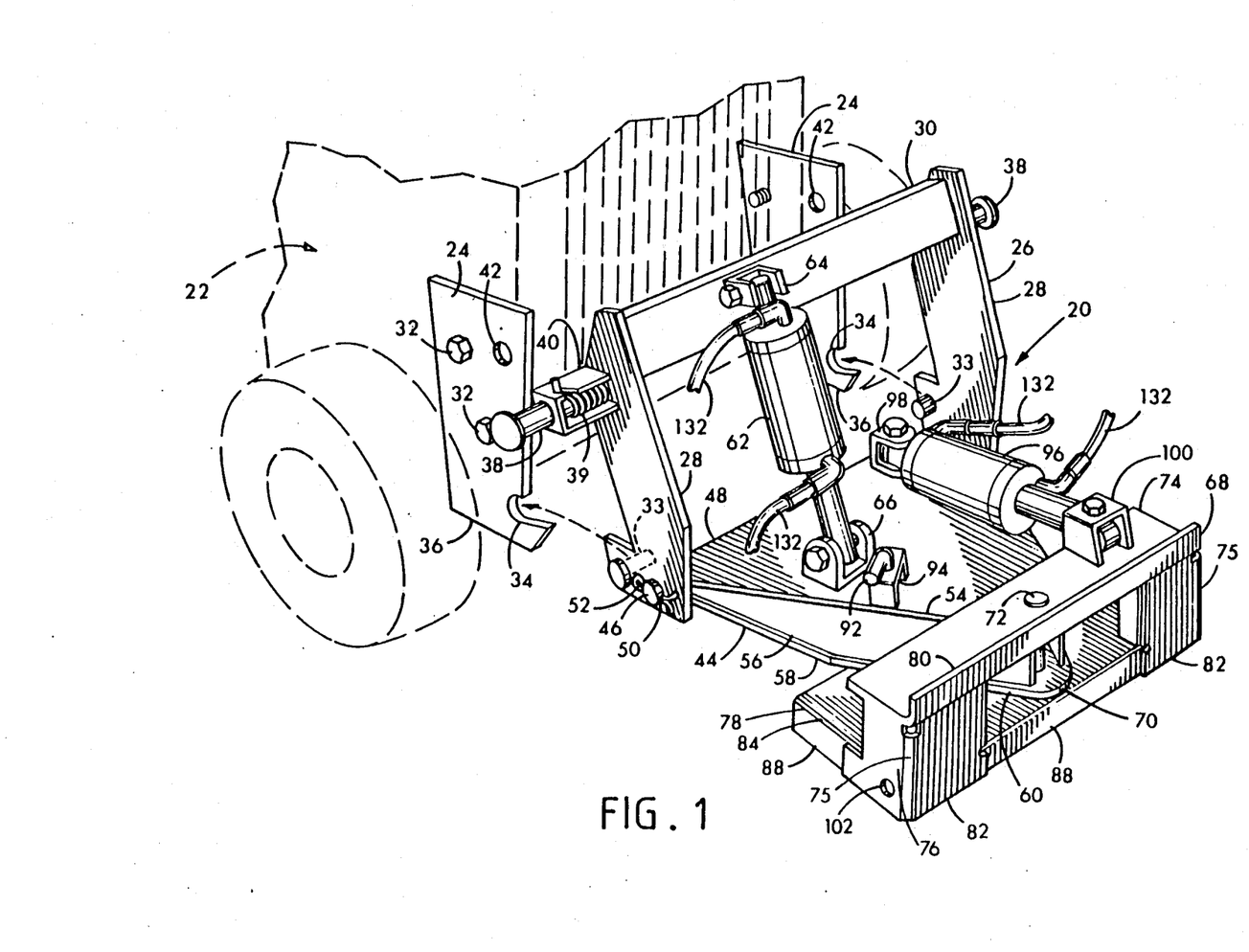
FIG. 1 is an exploded isometric view of the quick attaching coupler and mounting bracket of this invention connected to the front end of a tractor.

Referring more particularly to FIGS. 1-13, wherein like numbers refer to similar parts, a quick attaching coupler 20 is shown in FIG. 1. The coupler 20 is used for mounting implements to a vehicle. An implement is any attachment or accessory used in connection with the vehicle for transporting or doing work. The coupler 20 is detachably mounted to the front of a vehicle, here illustrated as a conventional tractor 22, by engagement with two vertical mounting brackets 24.

The coupler 20 has an upright brace or mounting frame 26 which consists of two vertical members joined by a horizontal crossbar. The vertical members 28 are spaced by the crossbar 30 to fit on the outside of the mounting brackets 24 which are connected to the tractor 22 by two bolts 32 or may be conventionally provided by the tractor mounting frame. A fixed cylindrical pin 33 is located at the lower end of each vertical member 28 and is positioned to engage within aligned oblong slots 34 in the lower portions 36 of the mounting brackets 24. The oblong slots 34 are inclined upwardly somewhat to retain the fixed pins 33 of the connected coupler 20 against horizontal movement. Spring-loaded pins 38 are mounted in pin brackets 40 on the vertical members 28 above the fixed pins 33. The spring-loaded pins 38 travel through holes (not shown) in the vertical members 28 which when the coupler 20 is attached to the tractor 22 are aligned with through holes 42 located above the slots 34 in the mounting brackets 24. A generally triangular A-frame 44 is pivotally connected to the mounting frame 26 by a rod 46 running through bushings 48 on the rear of the A-frame 44 and through holes 50 in the vertical members 28 forward of the fixed pins 33. The rod 46 is held in place by cotter pins 52. As best seen in the side view of FIG. 8, the A-frame 44 has a planar top plate 54 which has two side plates 56 which connect the top plate 54 to a bottom plate 58 which extends downwardly from the bushings 48 to a front portion which is parallel to the top plate 54. The bushings 48, the top plate 54, the side plates 56 and the bottom plate 58 are rigidly connected such as by welding to make the A-frame 44 a rigid box-like structure.

The A-frame 44 is pivoted about the rod 46 by a vertical actuator 62 which is preferably a hydraulic cylinder. The actuator 62 is pivotally connected to the horizontal crossbar 30 by a bracket 64, and is pivotally connected to the A-frame 44 by a second bracket 66. The travel of the A-frame 44 will depend on the size and extension of the actuator 62, but in the preferred embodiment, the A-frame 44 may be rotated sufficiently to raise an attached implement twelve inches above grade and to depress it three inches below grade.

An implement support 68 is pivotally connected at the apex 70 of the A-frame 44 by a pin 72. The implement support 68 has an upper plate 74 joined by side plates 76 to a pivoting table 78. The upper plate 74 has an upturned flange 80. In the preferred embodiment, the flange extends slightly more than one-half inch above the surface of the upper plate 74. The flange 80 is an extended linear flange, and is preferably formed as one piece with the upper plate 74. Additional rigidity is imparted to the implement supports 68 by front plates 82 which are connected to the side plates 76 and the pivoting table 78 but which need not be connected directly to the upper plate 74. The upper plate 74, side plates 76, and front plates 82 as well as the flange 80 may be formed of a single bent sheet of steel plate. A locking hole 102 is located in each support side plate 76 and is of suitable diameter for receiving the locking pins 104 mounted on the implement 108.

A beveled surface 75 is formed where the front plates 82 meet the side plates 76 of the support, forward of the locking holes 102. The surfaces 75 act as cams to gradually depress the spring mounted locking pins 104 on the implement 108 when the coupler 20 is connected to the implement coupling mechanism 106 on the implement 108.

The pivoting table 78 has an upper pivot plate 84 and a bottom pivot plate 86 connected by sides 88 to form a rigid box. The upper and bottom pivot plates 84, 86 have a series of radial holes 90 which accept a locking rod 92 spring-loaded in a bracket 94 mounted on the top plate 54 of the A-frame 44 for locking the implement support 68 at a fixed angle to the A-frame 44.

The implement support 68 is pivoted on the A-frame 44 about the pin 72 by a horizontal actuator 96 which is preferably a hydraulic cylinder and piston assembly. The actuator 96 is pivotally connected to the A-frame 44 by a bracket 98 fixed to the top plate 54 adjacent the bushings 48, and is pivotally connected to the support 68 by a bracket 100.

Figure 2:
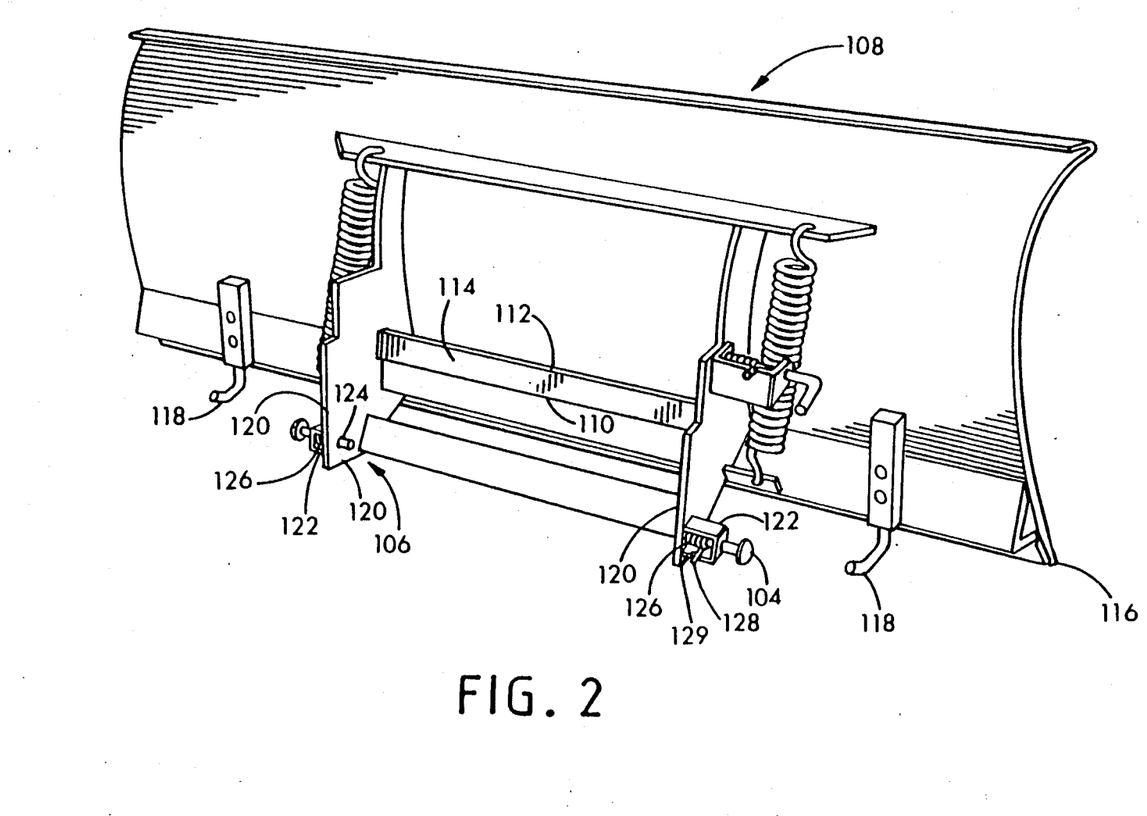
FIG. 2 is a perspective view of a snowplow to which is mounted attaching mechanism of this invention.

Locking holes 102 extend through the side plates 76 of the implement support 68 and the sides 88 of the pivoting table 78 and are adapted to engage with the locking pins 104 of an implement coupling mechanism 106 attached to an implement 108, as shown in FIG. 2.

The implement 108 illustrated is a conventional snowplow, but may be any implement for mounting to a vehicle, for example, a snowblower, a tiller or a broom.

Figure 8:
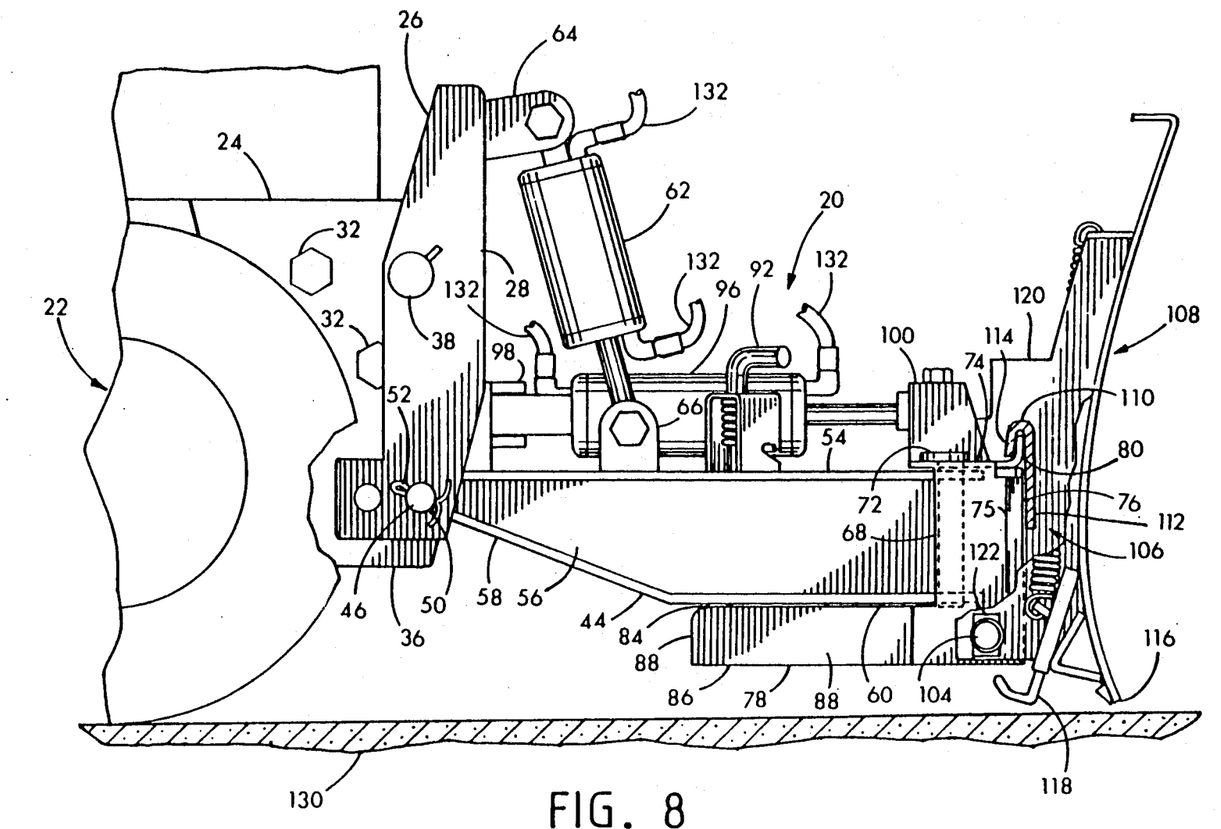
FIG. 8 is a side view of the assembly of FIG. 6 with the coupling mechanism of the implement partially broken away.

As best shown in FIGS. 2 and 8, the implement coupling mechanism 106 consists of a downturned J-shaped bracket 110 mounted to two vertical side plates 120 above two spring-loaded locking pins 104 running through the plates 120. The downturned J-shaped bracket 110 has a vertical portion 112 and an opposed portion 114 which extends downwardly approximately the same distance as the flange 80 extends upwardly from the upper plate 74 of the implement support 68. The opposed portion 114 is inclined outwardly somewhat from the vertical portion 112 and the two portions 112, 114 define a wedge-shaped space which acts to capture the inserted flange 80 of the support 68. The vertical portion 112 is preferably longer than the opposed portion to serve as an abutment against which the approaching coupler 20 may make contact. The vertical portion 112 then acts to direct the flange 80 into engagement between the opposed portion and the vertical portion. The bracket 110 is connected at its ends to the vertical side plates 120. Each side plate has radiused out-turned edges 121 which assist in aligning the coupler 20 with the coupling mechanism 106 on the implement 108. The locking pins 104 are located on the side plates 120 beneath the J-shaped bracket 110 and are on either side of the J-shaped bracket 110. The locking pins 104 are spaced from the bracket 110 such that when the bracket 110 is engaged on the upturn flange 80 the locking pins 104 will be in position to engage with the locking holes 102 of the coupler 20. The locking pins 104 are retained in brackets 122 mounted on the vertical plates 120 adjacent clearance holes 124 to permit the movement of the locking pins 104 which are spring-loaded by springs 126 engaging with protruding studs 128 extending from each locking pin 104.

The exemplary implement 108 shown has a plow blade 116 and two feet 118 which support the implement 108 and the implement coupling mechanism 106 in an upright position. The coupling mechanism 106 is connected to the implement 108 by the two opposed vertical plates 120.

Figure 3:
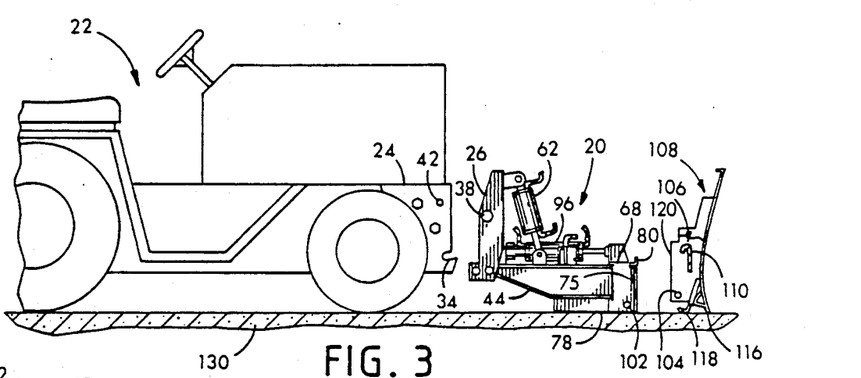
FIG. 3 is a side elevational view of the quick attaching coupler of FIG. 1 and the plow of FIG. 2 resting on the ground prior to attachment to the mounting brackets of FIG. 1 on a conventional tractor.
Figure 4:
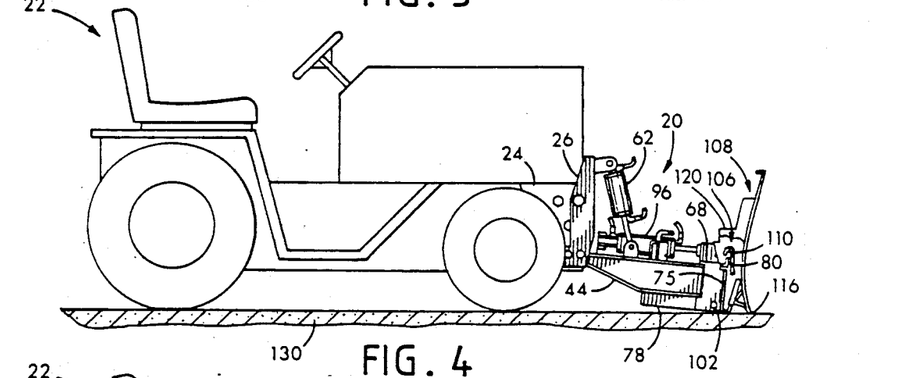
FIG. 4 is a side elevational view of the quick attaching coupler of FIG. 3 mounted on the mounting brackets connected to the tractor and positioned beneath the quick attaching mechanism of the plow.
Figure 5:
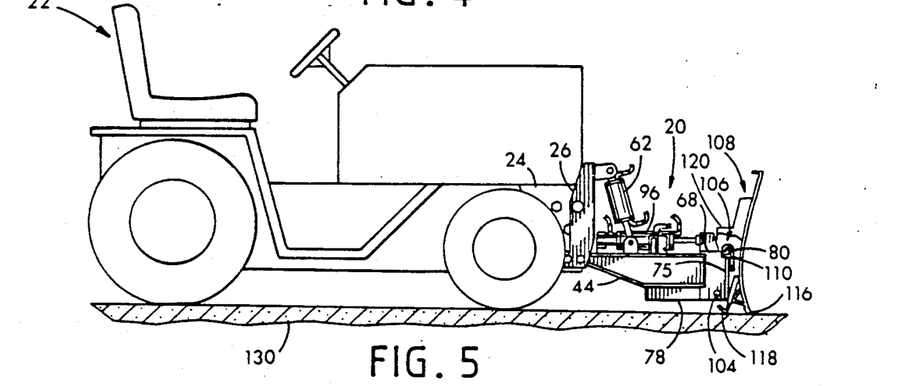
FIG. 5 is a side elevational view of the quick attaching coupler of FIG. 4 fully coupled to the quick attaching mechanism of the plow.

The operation of the quick attaching coupler 20 and implement coupling mechanism 106 of this invention is illustrated in FIGS. 3, 4 and 5. In FIG. 3 the tractor 22 has been parked adjacent the coupler 20 and the implement 108 which are resting on the ground 130 in upright positions. To attach the coupler 20 to the tractor 22 the operator dismounts from the tractor and lifts the coupler 20 and slides the fixed pins 33 of the mounting frame 26 into the oblong slots 34 of the mounting brackets 24. With the weight of the coupler 20 substantially supported by the mounting brackets 24 the coupler 20 is rotated towards the tractor 22. The spring-loaded pins 38 in the vertical members 28 of the mounting frame 26 are positioned over the through holes 42 in the mounting brackets 24 and with the spring-loaded pins 38 released from their retracted positions, the springs 39 urge the pins to engage in the through holes 42. Once the coupler 20 is mechanically attached to the tractor 22, the hydraulic lines 132 (shown partly broken away) are connected to the hydraulic fittings (not shown) of the tractor 22.

Once the coupler 20 has been attached to the tractor 22, the operator may quickly attach an implement to the tractor 22 without having to dismount from the tractor 22. To achieve the attachment, the vertical actuator 62 is activated to depress the A-frame 44 and the connected implement support 68 so that the implement support 68 is angled downwardly towards the ground 130 as shown in FIG. 4. With the implement support 68 so inclined, the tractor 22 is advanced towards the implement 108 which is resting with the locking pins 104 released and urged by the springs 126 to extend through the vertical plates 120. The tractor 22 is advanced towards the implement 108 until the upturned flange 80 is positioned directly below the downturned J-shaped bracket 110 of the implement coupling mechanism 106 of the implement 108. The curved edges 121 of the vertical plates 120 guide the implement coupler 20 into proper alignment with the implement coupling mechanism 106. When the upturned flange 80 makes contact with the vertical portion 112 of the J-shaped flange the operator may then raise the support to bring the flange 80 into engagement between the vertical portion 112 and the opposed portion 114 of the downturned J-shaped bracket 110.

The coupler 20 is thus engaged with the implement 108 by activating the vertical actuator 62 to rotate the A-frame 44 and the implement support 68 about the bushings 48 to raise the upturned flange 80 into engagement with the J-shaped bracket 110 of the implement coupling mechanism 106. As the flange 80 rotates into engagement with the bracket 110, and the implement 108 is lifted by the coupler 20, the locking pins 104 of the implement coupling mechanism travel over the beveled surfaces 75 of the implement support 68, being depressed against the springs 126 until the locking pins 104 are positioned over the locking holes 102 at which point the springs 126 drive the locking pins 104 into engagement with the locking holes 102. At this point, as shown in FIG. 5, the implement coupling mechanism 106 and the implement 108 are securely attached to the coupler 20 and the tractor 22.

Figure 6:
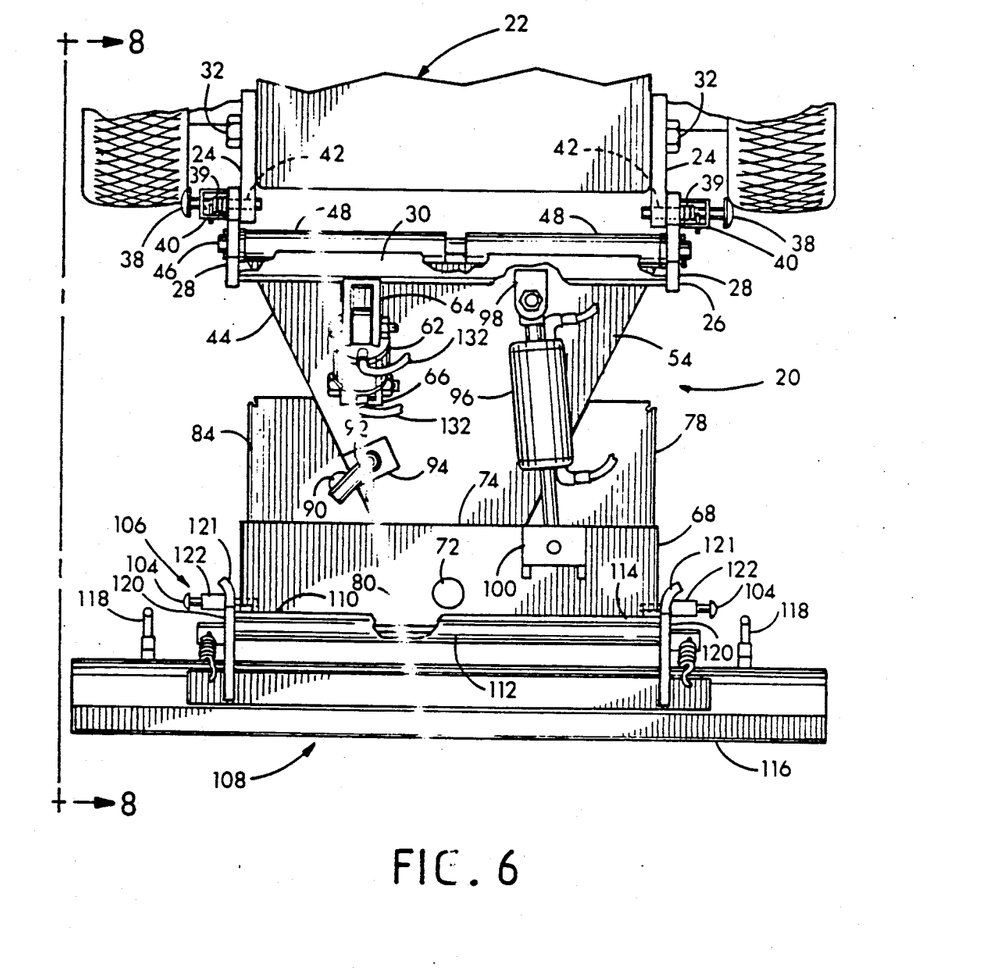
FIG. 6 is a top plan view of the connected mounting brackets, coupler and implement of FIG. 5.
Figure 7:
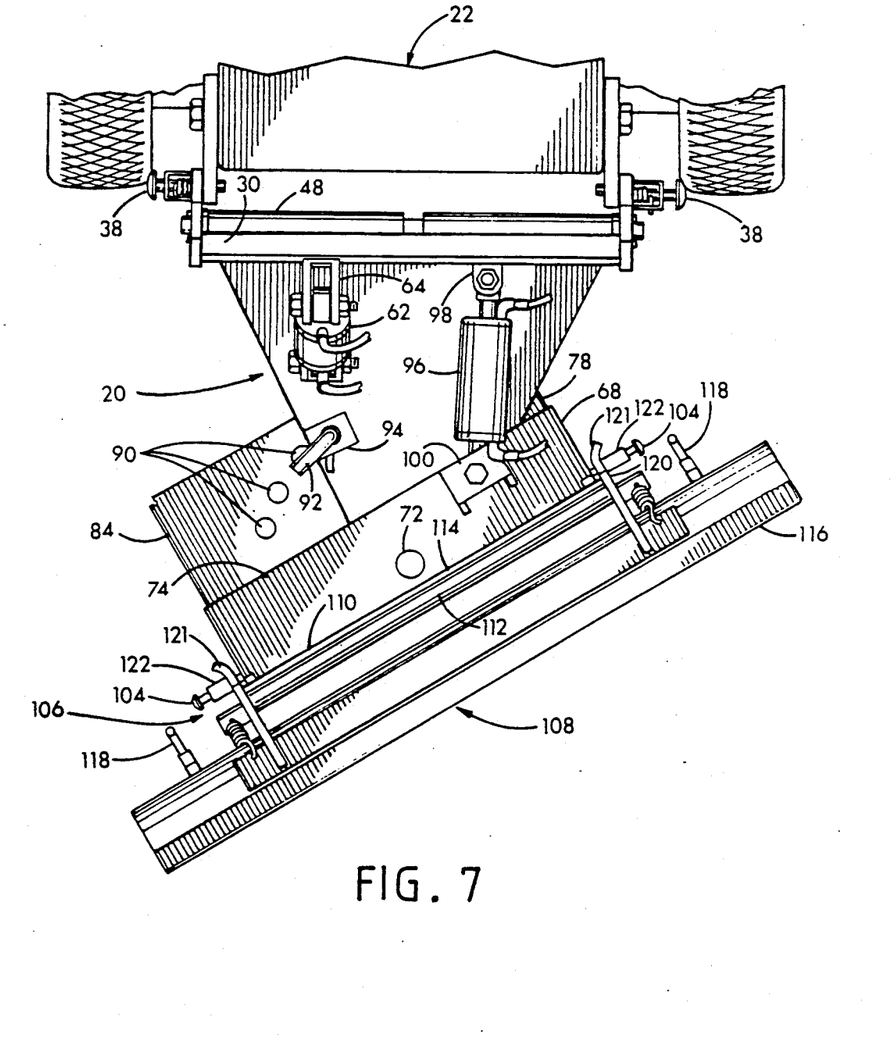
FIG. 7 is a top plan view of the assembly of FIG. 6 with the plow in a full left position.

As shown in FIG. 6, the weight of the implement 108 is carried by the upturned flange 80 of the support 68 and is distributed along the linear length of the flange 80. The attached implement may be raised or lowered as desired for transporting the implement or performing work, by hydraulic operation of the vertical actuator 62. The horizontal actuator 96 may be used to turn the implement to the right or the left (as shown in FIG. 7). In the preferred embodiment, the horizontal actuator 96 is sufficient to rotate the implement 30° to the right or to the left. The hydraulic control system of the tractor may additionally permit the implement to float and follow the terrain when desired.

If it is not desired to rotate the implement, or if the hydraulic lines leading to the horizontal actuator 96 are to be used for controlling functions of the implement, the implement support 68 may be locked into position by use of the locking rod 92 which may be inserted into any of the holes 90 in the pivoting table 78.

To detach an implement from the coupler 20 the locking pins 104 of the implement coupling mechanism 106 are pulled outward into the retracted position engaging the studs 128 on the pins 104 within slots 129 on the brackets 122. The A-frame 44 and the implement support 68 are rotated downwardly by activating the vertical actuator 62 until the upturned flange 80 is disengaged from the L-shaped bracket 110 freeing the coupler 20 to move away from the implement 108.

The implement coupling mechanism 106 may be affixed to any conventional implement. Hence, an operator may rapidly exchange implements. It should be noted that the particular shape of the vertical plates 120 and the structure for connecting the implement coupling mechanism 106 to the implement may vary depending on the configuration of the implement to which the coupling mechanism 106 is affixed. Although, for clarity, an under-vehicle mower has not been illustrated, the present bracket 24 and coupler 20 assembly may easily be mounted on a vehicle having such a mower mounted thereon without interference.

Figure 9:
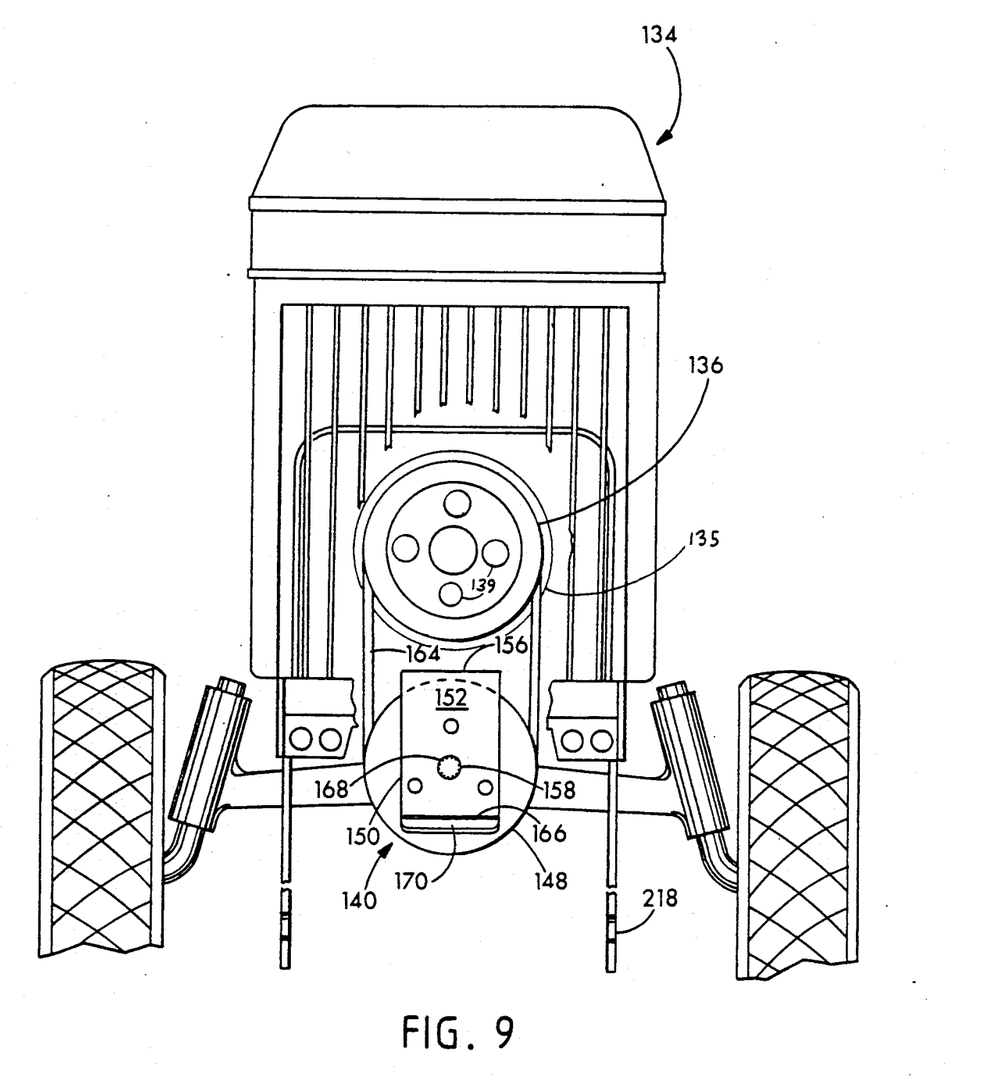
FIG. 9 is a front elevational view of the pulley assembly of the power-take-off conversion unit of this invention mounted to the front end of a tractor.
Figure 10:
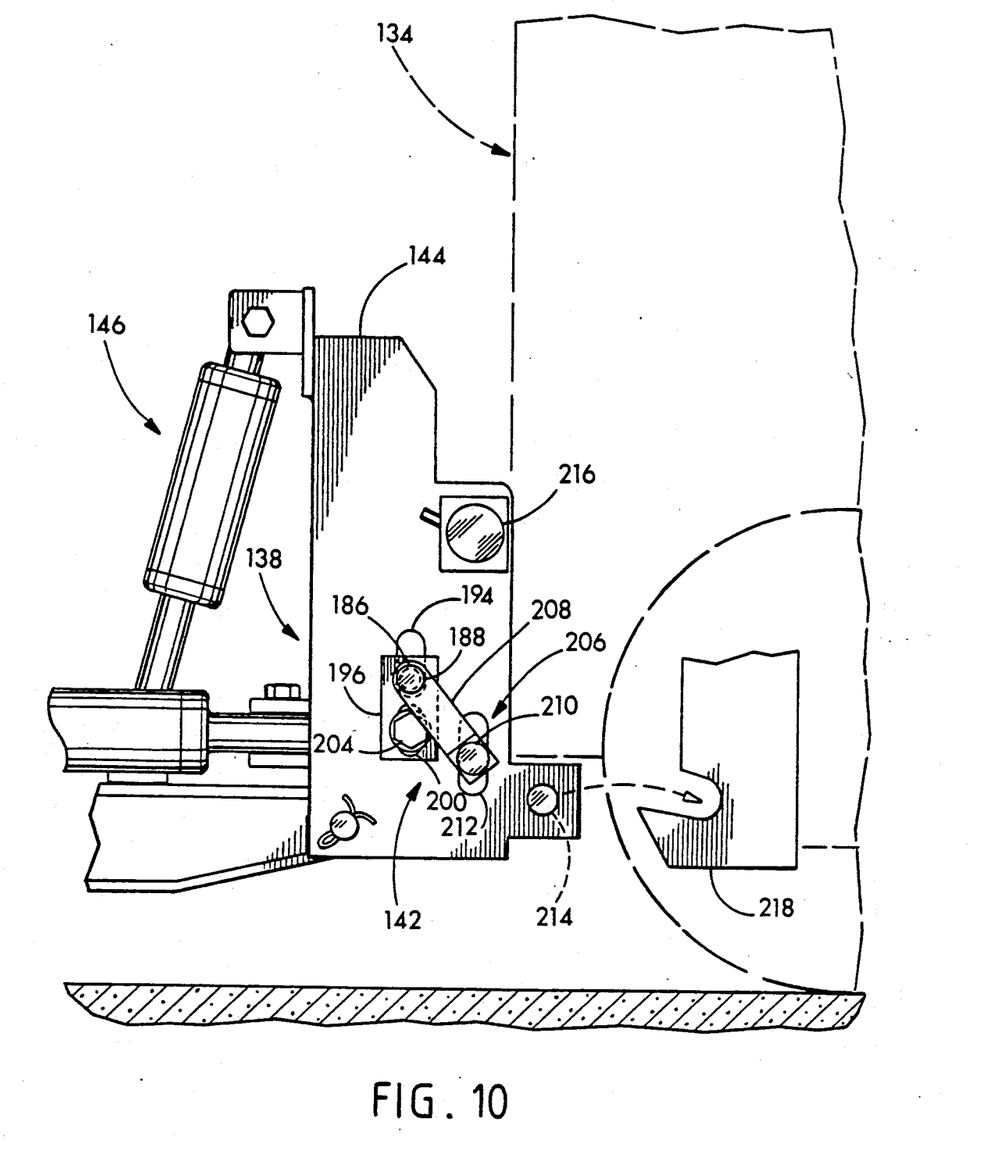
FIG. 10 is a side elevational view of the power-take-off conversion unit of this invention mounted to a quick attaching coupler and spaced from the tractor.

Some vehicles, such as the utility tractor illustrated in FIG. 9, are provided with a pulley 135 which rotates in a generally vertical plane. This pulley is used to drive belt-driven implements such as an under-the-chassis lawnmower. Many conventional implements, however, are adapted to be driven by a rotating shaft. A quick attaching power-take-off conversion unit 138, shown in FIGS. 9-13 is provided by this invention to permit the quick conversion of a belt-drive pulley on a vehicle to present a conventional power-take-off shaft. To accommodate the conversion unit 138 to a variety of vehicle pulleys, a driving pulley 136 of optimum dimensions is attached coaxially to the vehicle pulley 135 by bolts 139 and rotates with the vehicle pulley in a generally vertical plane. The conversion unit 138 consists of two main elements, a pulley assembly 140 which is mounted to the vehicle 134, and a belt-tensioning assembly 142 which is mounted to the vertical members 144 of the coupler 146.

Figure 11:
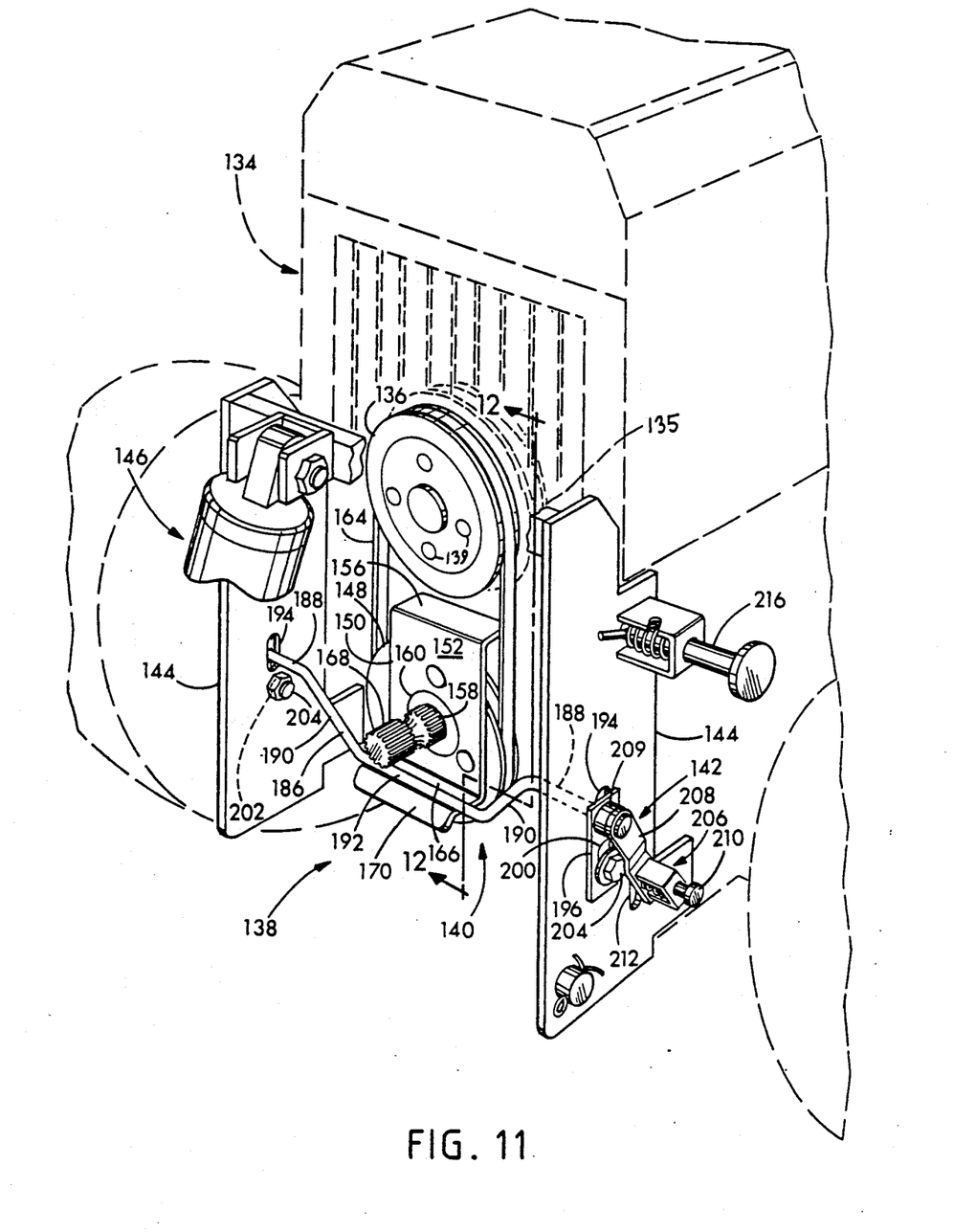
FIG. 11 is an isometric view of the power-take-off conversion unit of FIG. 10.

As best seen in FIG. 11, the pulley assembly 140 consists of a driven pulley 148 which is mounted within a metal frame 150. The frame 150, which is preferably formed of bent steel plate, has a front portion 152 and a rear portion 154 which is spaced horizontally from the front portion 152 by a horizontal top portion 156. The front and rear portions 152, 154 of the frame 150 have centrally located shaft holes 158 which are fitted with ballbearing assemblies 160 to accept the shaft 162 of the pulley 148 mounted between the front and rear portions 152, 154. The pulley 148 is preferably a V-grooved pulley which is adapted to engage with an elastic belt 164 so as to be driven by the driving pulley 136.

Figure 12:
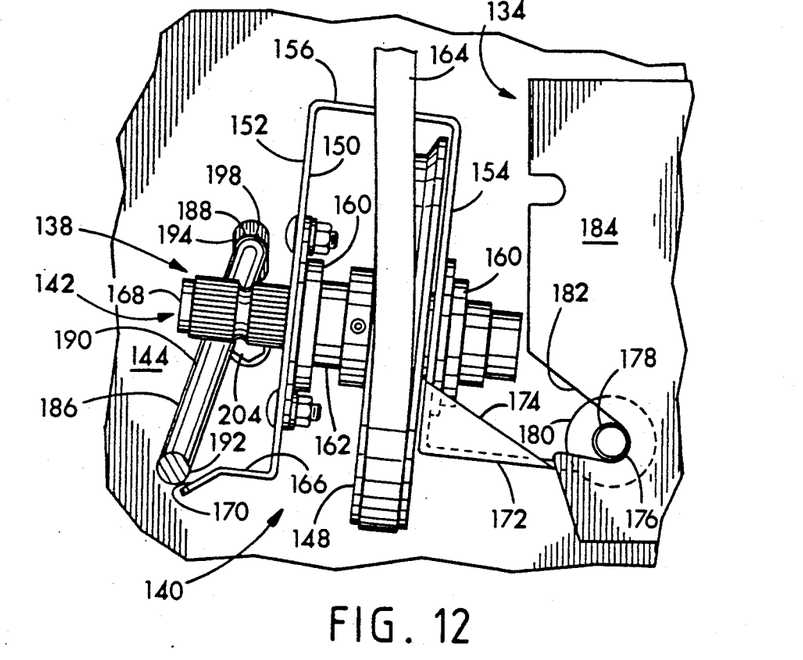
FIG. 12 is a cross-sectional view of the apparatus of FIG. 11 taken along section line 12—12, showing the belt in an untensioned position.
Figure 13:
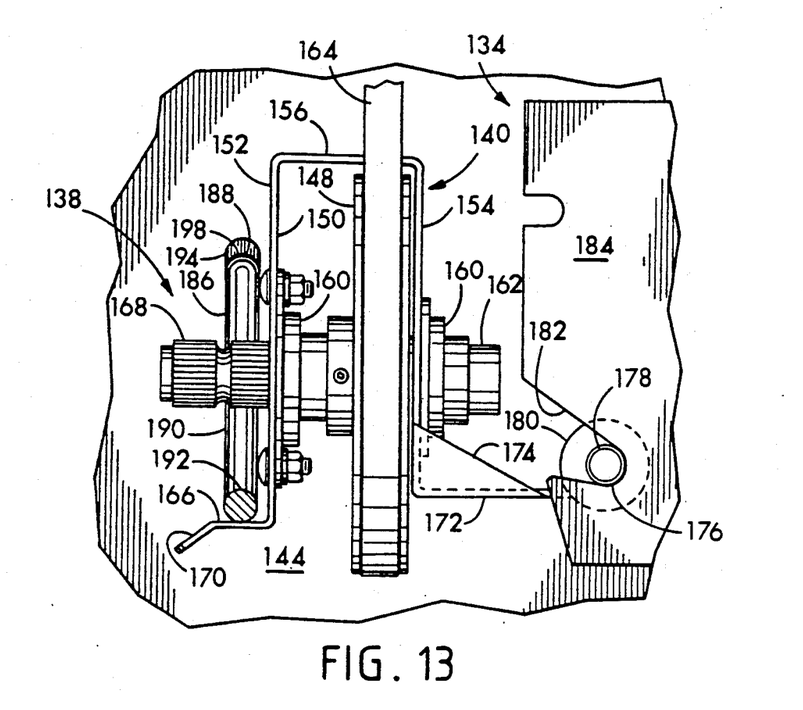
FIG. 13 is a cross-sectional view of the apparatus of FIG. 12 showing the belt in a locked belt-tensioned position.

As best shown in FIGS. 12 and 13, the frame 150 has a planar locking surface 166 which extends from the front portion 152 and is generally perpendicular to the front portion. The locking surface 166 is located sufficiently beneath the power-take-off shaft 168 extending from the shaft 162 of the pulley 148, to provide clearance for the attachment of any desired implement. A cam surface 170 extends downwardly and outwardly from the locking surface 166. The power-take-off shaft 168 is preferably splined to provide for good attachment to an implement.

A plate-like arm member 172 extends rearwardly from the rear portion 154 of the frame 150 and is rigidified by two triangular gusset plates 174. The arm member has portions adapted to engage within the brackets 184, which take the form of a rod 176 welded to the rear of the arm member 172 and terminating at each end in a pin 178 which is backed by a washer-like spacer and locator 180. The rod 176 and pins 178 establish a horizontal axis of rotation when the pins 178 are engaged within slots 182 on mounting brackets 184 located on the vehicle 134 beneath the driving pulley 136.

The belt-tensioning assembly 142 consists of a belt-tensioning bar 186, best shown in FIGS. 11-13, and associated hardware for mounting and securing the bar 186 to the vertical members 144 of the coupler 146. The belt-tensioning bar 186 has two aligned axle portions 188 which define a horizontal axis about which the bar 186 rotates. An offset portion 192 is downwardly offset from the axis of rotation by two inclined connecting portions 190.

The bar 186 is mounted within vertical slots 194 in the vertical members 144. The bar 186 also extends through adjustable positioning plates 196 which are mounted adjacent each vertical member 144 on the outside. Each positioning plate 196 has a circular bar hole 198 through which the tensioning bar 186 extends, and a vertical slot 200 aligned beneath the hole 198. The vertical slot 200 on a positioning plate 196 overlies a circular hole 202 in a vertical member 144. A fastener 204 extends through the vertical slot 200 in the positioning plate and the circular hole 202 in the vertical member 144 to locate the bar hole 198 and hence the axis of rotation of the belt-tensioning bar 186.

On one side of the belt-tensioning bar 186 a lock 206 is provided for fixedly locating the tensioning bar 186 with respect to the vertical members 144 of the coupler 146 and thus with respect to the vehicle 134. The lock 206 has a member 208 which extends perpendicularly to the bar 186 and which is spaced from the positioning plate 196 by a spacer 209, and a spring-loaded pin 210 which is mounted on the member 208. The pin 210 is adapted to engage within a vertical slot 212 located on a vertical member 144 rearwardly of the vertical slot 194 and the axis of rotation of the bar 186.

The pulley assembly 140 is easily installed on a vehicle 134 when it is desired to convert the driving pulley 136 motion to a rotating shaft motion, by inserting the pulley assembly 140 such that the pins 178 of the rod 176 on the arm member 172 engage within the slots 182 of the mounting brackets 184, which may be standard equipment for a vehicle, or which may be installed to accommodate the power-take-off conversion unit 138. The pulley assembly 140 is installed so as to engage the belt 164 within the driven pulley 148, as shown in FIG. 12. The loose belt 164 will support the pulley assembly 140 in a generally upright position.

As shown in FIG. 12, a coupler 146, generally similar to the coupler 20 described above, with mounting pins 214, 216, is mounted fixedly to the vehicle 134 with the pins 214 engaging within brackets 218 on the vehicle 134. In order to tension the belt 164 and place the pulley assembly 140 in a vertical position for efficient operation, the lock 206 of the belt-tensioning bar 186 is grasped and rotated rearwardly until the spring-loaded pin 210 engages with the vertical slot 212 as shown in FIG. 11. As best seen in FIG. 12 this rotational motion of the tensioning bar 186 pushes the offset portion 192 against the cam surface 170 of the frame 150. The offset portion 192 moves along the cam surface 170 until it engages with the locking surface 166 of the frame 150 as best shown in FIG. 13. When the belt-tensioning bar 186 is locked in place tension is applied to the elastic belt 164 by the driven pulley 148 and the driving pulley 136 may be operated to effectively drive the power-take-off shaft 168 and any attached implement (not shown).

The positioning plates 196 provide for the adjustment of the tension on the belt 164 by moving vertically the axis of rotation of the bar 186. By loosening the fasteners 204, the tensioning bar 186—in the unlocked position—may be raised or lowered and the positioning plates 196 fixed in place by re-engaging the fasteners 204 when the proper height for the desired tension is reached.

Although in the preferred embodiment a separate driving pulley is attached to the pulley of the vehicle, it is understood that a properly dimensioned vehicle pulley may also serve as a driving pulley.

It should be noted that although the power-take-off conversion unit is shown adapted for a particular tractor, its dimensions and proportions may be varied to accommodate the location and size of the driving pulley of a particular vehicle.

Also, although a set of two mounting brackets to receive the power-take-off conversion unit is shown, one, three or more brackets may be provided on different vehicles with a commensurate change in number and position of pins on the arm member.

Furthermore, although the coupler has been illustrated attached to the front end of a vehicle, it may also be effectively attached to the back of a vehicle if desired. Although the vehicle illustrated is a tractor, the coupler may be attached to any vehicle, including a utility cart, a truck, a lift truck or other vehicle.

It is understood that the invention is not confined to the particular construction and arrangement of parts herein illustrated and described, but embraces such modified forms thereof as come within the scope of the following claims:

I claim:

1. An apparatus for attachment to a vehicle with a driving pulley rotatable in a generally vertical plane and driving an elastic belt, the vehicle having a mounting bracket located beneath the pulley; comprising:
  a) a frame having an upright front portion connected by a top portion to a rear portion horizontally spaced from the front position, an arm member extending rearwardly from the rear portion and having portions adapted to engage within the mounting bracket on the vehicle to allow the frame to rotate about a horizontal axis, and the frame has a planar locking surface extending from the front portion generally perpendicular to the front portion and a cam surface extends downwardly and outwardly from the locking surface;
  b) a driven pulley rotatively mounted within the frame between the front and rear portions and the frame and adapted to engage within and be driven by the elastic belt of the vehicle;
  c) a drive shaft extending from the driven pulley and adapted for driving engagement with an implement attached to the vehicle;
  d) a belt-tensioning bar rotatively mounted to the vehicle about a horizontal axis located above the locking surface of the frame, wherein the bar has a portion which is downwardly offset from the axis of rotation of the bar and the bar is adapted to be rotated such that the offset portion engages with the cam surface of the frame and causes the frame to rotate such that a desired tension is applied to the belt by the driven pulley when the bar offset portion is engaged with the locking surface of the frame; and
  e) a releasable lock located on the belt-tensioning bar to selectively fix the position of the bar with respect to the vehicle.

2. The apparatus of claim 1 wherein the belt-tensioning bar has two aligned axle portions extending from the offset portion and the lock comprises a member extending perpendicular to one axle portion and a spring-loaded pin is mounted on the extending member and is adapted to engage within a slot fixedly located with respect to the tractor.

3. The apparatus of claim 1 further comprising:
  a) two horizontally spaced vertical members which extend from the vehicle on either side of the frame, the vertical members having portions defining vertical slots, wherein the belt-tensioning bar extends through the slots, the vertical members further having portions defining holes aligned with the vertical member slots;
  b) two adjustable plates positioned adjacent the vertical members, each plate having portions defining a hole through which the belt-tensioning bar extends, and each plate having a vertical slot aligned with the holes; and
  c) a fastener extending through each plate slot and the adjacent vertical member hole, wherein the fasteners and plates may be adjusted vertically to adjust the axis of rotation of the belt-tensioning bar and hence enable a greater or lesser tension to be applied to the belt.

4. An apparatus for connecting an implement with a downturned bracket and extendable locking pins to a vehicle having a driving pulley rotatable in a generally vertical plane and driving an elastic belt, and having mounting brackets located beneath the pulley; comprising:
  a) an upright brace having two vertical members and a connecting horizontal member, the vertical members being adapted for attachment to a vehicle;
  b) a coupler frame pivotally mounted on a horizontal axis to the vertical members beneath the horizontal member;
  c) an actuator connecting the brace and the coupler frame such that the coupler frame may be pivoted about the horizontal axis;
  d) a support pivotally mounted on the coupler frame about a vertical axis and having an upturned flange adapted to engage beneath a downturned bracket of an implement, the support having portions defining pinholes located beneath the flange to receive locking pins extending from the implement to connect the implement to the apparatus, wherein a connected implement will be raised and lowered as the actuator pivots the frame about the horizontal axis;
  e) a frame having an upright front portion connected by a top portion to a rear portion horizontally spaced from the front portion, an arm member extending rearwardly from the rear portion, two pins extending horizontally from the rear of the arm member, wherein the pins are adapted to engage within the mounting brackets on the vehicle to allow the frame to rotate about a horizontal axis, and the frame has a planar locking surface extending from the front portion generally perpendicular to the front portion and a cam surface extends downwardly and outwardly from the locking surface;
  f) a driven pulley rotatively mounted within the frame between the front and rear portions of the frame and adapted to engage within and be driven by the elastic belt of the vehicle;
  g) a drive shaft extending from the driven pulley and adapted for driving engagement with an implement attached to the vehicle;
  h) a belt-tensioning bar rotatively mounted to the vertical members of the upright brace about a horizontal axis located above the locking surface of the frame, wherein the bar has a portion which is downwardly offset from the axis of rotation of the bar and the bar is adapted to be rotated such that the offset portion engages with the cam surface of the frame and causes the frame to rotate such that a desired tension is applied to the belt by the driven pulley when the bar offset portion is engaged with the locking surface of the frame; and
  i) a releasable lock located on the belt-tensioning bar to selectively fix the position of the bar with respect to the vertical members.

5. The apparatus of claim 4 wherein the belt-tensioning bar has two aligned axle portions extending from the offset portion and the lock comprises a member extending perpendicular to one axle portion and a spring-loaded pin is mounted on the extending member and is adapted to engage within a slot defined by portions of a vertical member.

6. The apparatus of claim 4 further comprising:
  a) portions of the vertical members defining vertical slots, wherein the belt-tensioning bar extends through the slots, the vertical members further having portions defining holes aligned with the vertical member slots;
  b) two adjustable plates positioned adjacent the vertical members, each plate having portions defining a hole through which the belt-tensioning bar extends, and each plate having a vertical slot aligned with the holes; and c) a fastener extending through each plate slot and the adjacent vertical member hole, wherein the fasteners and plates may be adjusted vertically to adjust the axis of rotation of the belt-tensioning bar and hence enable a greater or lesser tension to be applied to the belt.

7. An apparatus for attachment to a vehicle with a pulley rotatable in a generally vertical plane, the vehicle having a mounting bracket located beneath the pulley; comprising:

a) a driving pulley mounted coaxially to the vehicle pulley and adapted to drive an elastic belt;

b) a frame having an upright front portion connected by a top portion to a rear portion horizontally spaced from the front portion, an arm member extending rearwardly from the rear portion and having portions adapted to engage within the mounting bracket on the vehicle to allow the frame to rotate about a horizontal axis, and the frame has a planar locking surface extending from the front portion generally perpendicular to the front portion and a cam surface extends downwardly and outwardly from the locking surface;

c) a driven pulley rotatively mounted within the frame between the front and rear portions of the frame and adapted to engage within and be driven by the elastic belt of the driving pulley;

d) a drive shaft extending from the driven pulley and adapted for driving engagement with an implement attached to the vehicle;

e) a belt-tensioning bar rotatively mounted to the vehicle about a horizontal axis located above the locking surface of the frame, wherein the bar has a portion which is downwardly offset from the axis of rotation of the bar and the bar is adapted to be rotated such that the offset portion engages with the cam surface of the frame and causes the frame to rotate such that a desired tension is applied to the belt by the driven pulley when the bar offset portion is engaged with the locking surface of the frame; and f) a releasable lock located on the belt-tensioning bar to selectively fix the position of the bar with respect to the vehicle.

8. The apparatus of claim 7 wherein the belt-tensioning bar has two aligned axle portions extending from the offset portion and the lock comprises a member extending perpendicular to one axle portion and a spring-loaded pin is mounted on the extending member and is adapted to engage within a slot fixedly located with respect to the tractor.

9. The apparatus of claim 7 further comprising:

a) two horizontally spaced vertical members which extend from the vehicle on either side of the frame, the vertical members having portions defining vertical slots, wherein the belt-tensioning bar extends through the slots, the vertical members further having portions defining holes aligned with the vertical member slots;

b) two adjustable plates positioned adjacent the vertical members, each plate having portions defining a hole through which the belt-tensioning bar extends, and each plate having a vertical slot aligned with the holes; and c) a fastener extending through each plate slot and the adjacent vertical member hole, wherein the fasteners and plates may be adjusted vertically to adjust the axis of rotation of the belt-tensioning bar and hence enable a greater or lesser tension to be applied to the belt.

* * * * *